May 11, 1948.　　　S. PINANSKI　　　2,441,250
DISPENSING APPARATUS
Filed May 2, 1947　　　4 Sheets-Sheet 1

Inventor
Samuel Pinanski
by Roberts, Cushman & Grover
Att'ys.

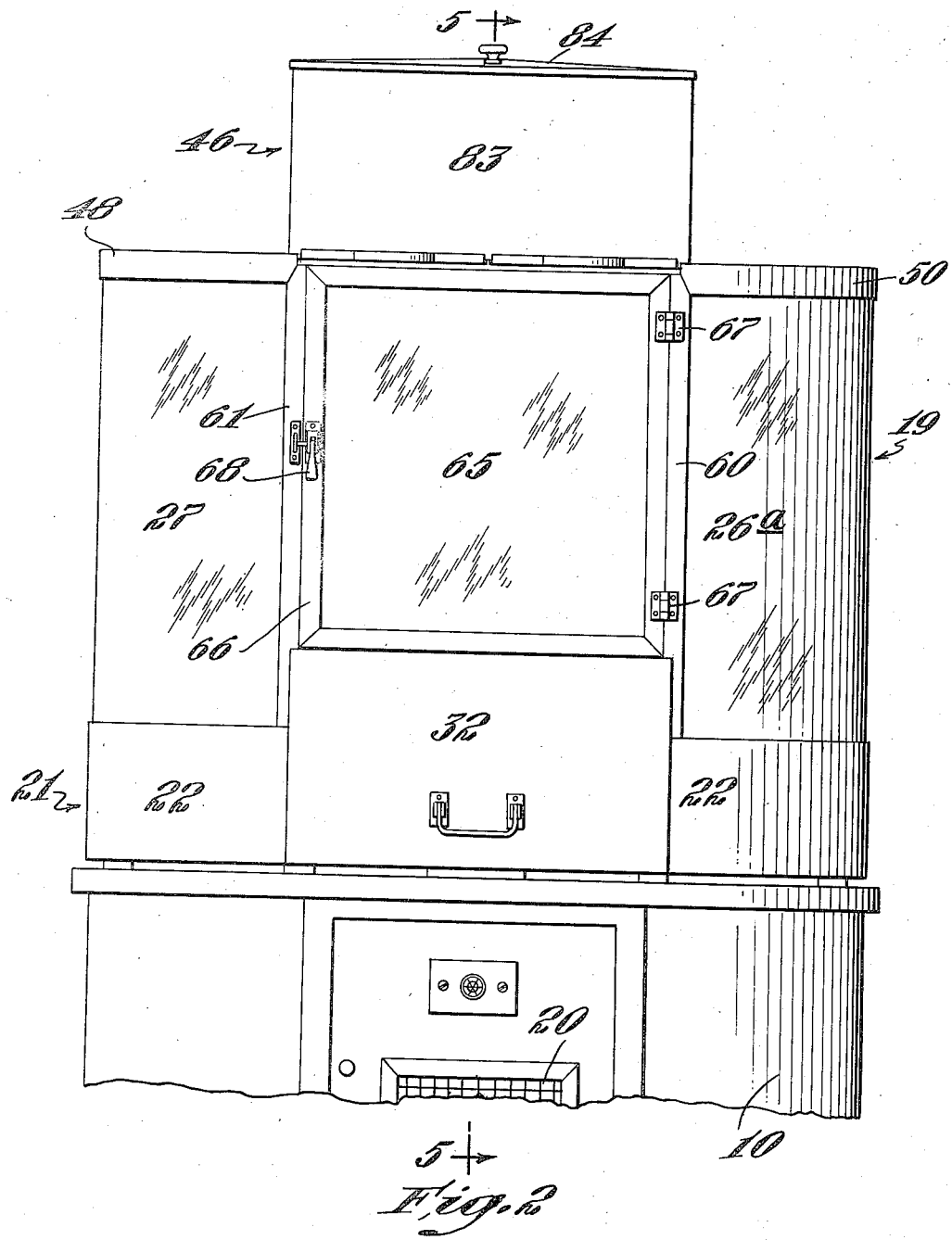

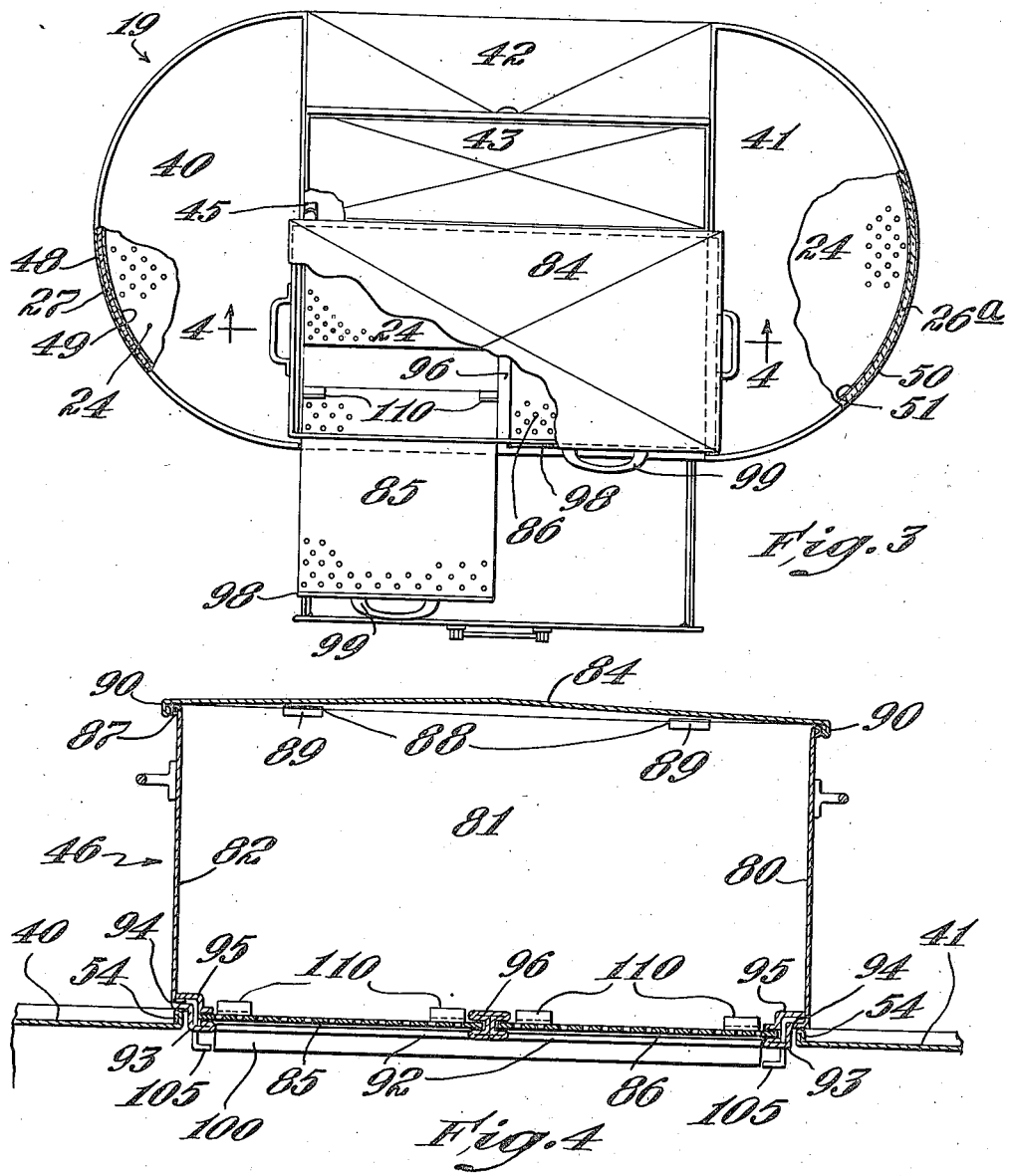

May 11, 1948.  S. PINANSKI  2,441,250
DISPENSING APPARATUS
Filed May 2, 1947  4 Sheets-Sheet 4

Inventor
Samuel Pinanski
by Roberts, Cushman & Grover
att'ys.

Patented May 11, 1948

2,441,250

UNITED STATES PATENT OFFICE 2,441,250

DISPENSING APPARATUS

Samuel Pinanski, Brookline, Mass.

Application May 2, 1947, Serial No. 745,527

9 Claims. (Cl. 34—68)

This invention relates to apparatus for preserving and dispensing comestibles of a type which are to be delivered hot and crisp to the purchaser, for instance popped corn, potato chips, etc., and more particularly to the provision of an auxiliary storage chamber in combination with a main storage chamber whereby the supply of material in the latter may be replenished with a supply of warm material from the former rather than with cool material.

Dispensing devices having a main storage chamber for the comestibles to be dispensed, a filling aperture at the top thereof and means operative to deliver heated air to the main storage chamber to maintain the material warm and crisp are old. Examples are found in my copending application Serial No. 583,810, filed March 20, 1945, entitled Dispensing apparatus and method of treating popped corn, now Patent Number 2,423,342, and in Kelly Patents Nos. 2,005,501 and 1,973,347, dated June 18, 1935, and January 19, 1933, respectively. When the supply of heated material, for example popped corn, becomes depleted in the main storage chamber, it must either be replenished with cool material or with a separate supply of warm material. The cost of providing and heating a separate supply of warm material is so expensive that, so far as I know, such a method has not been used. The use of cool material for replenishment frequently results in dispensing to customers popped corn, or the like, which has not been warmed for a sufficient period thereby creating dissatisfaction of customers and the loss of good will and future sales. Accordingly it is necessary or advisable for an attendant to carefully observe the contents of the main storage chamber and to refill it with cool material soon enough so that an adequate warming period or interval will elapse before the added material is dispensed. This either requires an extra attendant or the interruption of sales by a single attendant and the consequent loss of business.

The present invention has for one of its objects the provision of an auxiliary storage chamber in combination with the main storage chamber of a preserving and dispensing apparatus which eliminates the aforesaid disadvantages of prior art dispensing devices and methods.

Other objects are the provision of a preserving and dispensing apparatus which may be operated by a single attendant to provide a continuous supply of warm and crisp comestible; such an apparatus which is economical to manufacture and simple to operate; and such an apparatus which may be easily and cheaply installed in, or combined with, various makes and types of dispensing apparatus which are now, or which may hereafter be, available or in use.

A further object is to provide such a dispensing apparatus which, when not in use, may be tightly closed to prevent the entry of dust and dirt.

Other and further objects and advantages of the invention will be apparent from the following description and by reference to the accompanying drawing in which:

Fig. 2 is a view in front elevation of the apparatus shown in Fig. 1;

Fig. 3 is a plan view of the apparatus of Fig. 1 with parts broken away and with one of the slideable bottom wall portions of the auxiliary storage chamber shown in partially open position;

Fig. 4 is an enlarged section on the line 4—4 of Fig. 3; and

Figure 1:
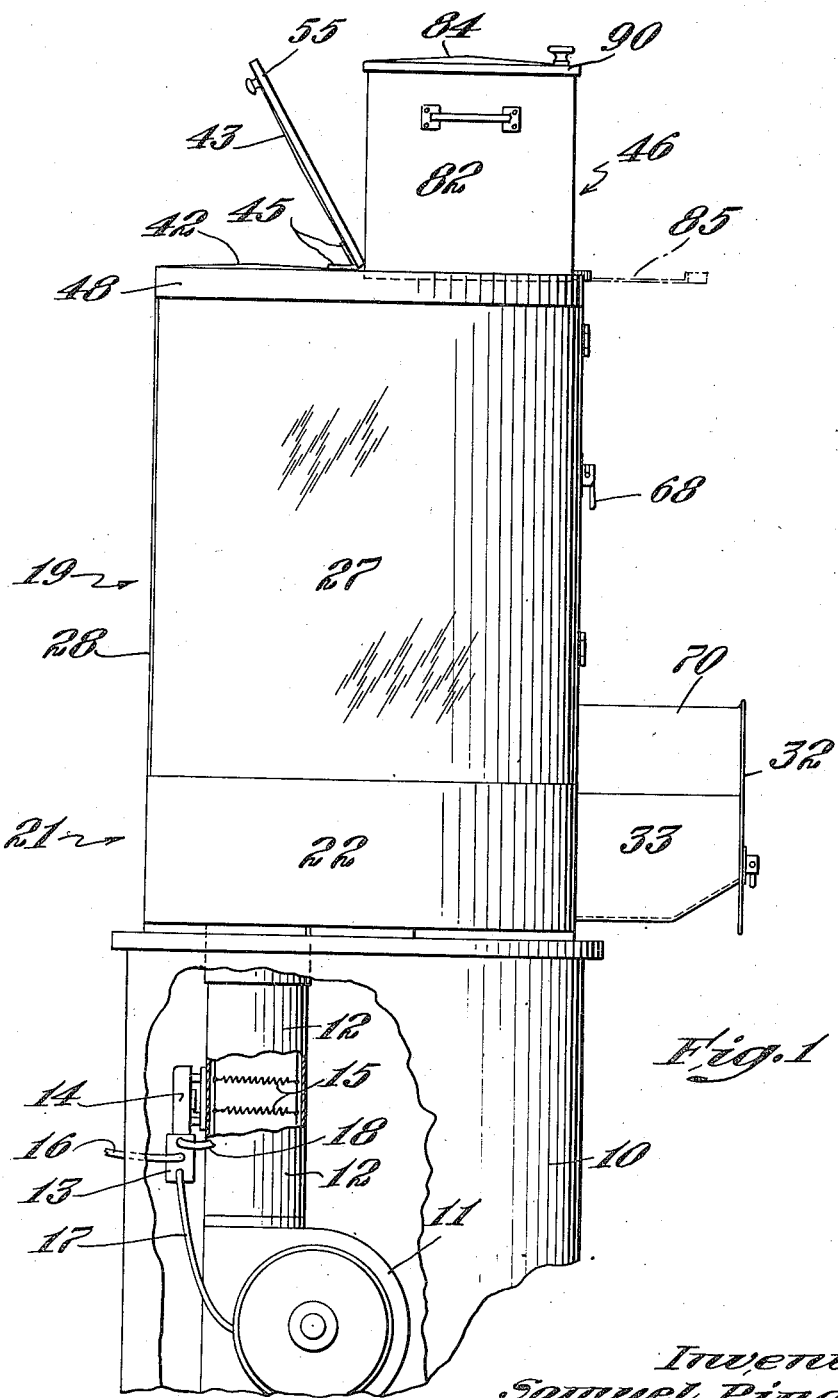
Fig. 1 is a view in side elevation of an apparatus embodying the invention, with certain parts broken away, and with the dispensing drawer shown in operative dispensing or open position.

The numeral 10 designates a cabinet which houses a suitable motor driven blower 11, hot air sleeve or casing 12, distributing box 13, thermostat 14 and heating coil 15. Electrical current is supplied through the conduit 16 from any suitable source, the conduit 16 entering the distributing box 13 from which the conduits 17 and 18 lead to the blower motor (not shown) and the heating coil 15, respectively. The thermostat 14, whose sensitively responsive element is exposed to the air within the casing 12, or which alternatively, if desired may be exposed to the air within the main storage chamber 19, controls the flow of current through the cable 18 to the heating element 15.

Air may be drawn in through the grille 20 by the blower 11 and the air is blown upwardly through the conduit 12 to the main storage chamber 19, as more fully described hereinafter.

A plenum chamber 21 is located beneath the main storage chamber 19. Its walls consist of the imperforate side wall 22, the imperforate bottom wall 23, the perforate top wall 24, the imperforate flange 25 of the wall 24 and/or the imperforate back wall 26 of the dispensing drawer.

The walls of the main storage chamber 19, in a preferred construction, consist to a major extent of sheet metal and glass. The perforate wall 24 which forms the top of the plenum chamber also serves as the bottom wall of the main storage chamber. The imperforate end walls 26ᵃ and 27 are of glass and are substantially semicircular in horizontal section. The imperforate back wall 28 is made of metal and is substantially straight. It extends between the rear vertical edges of the end walls 26ᵃ and 27. The perforate metal member 29 is secured in spaced relationship forwardly of the back wall 28 and with it provides a flue 30 for the warm air which is delivered to the plenum chamber 21 through the casing 12.

Figure 5:
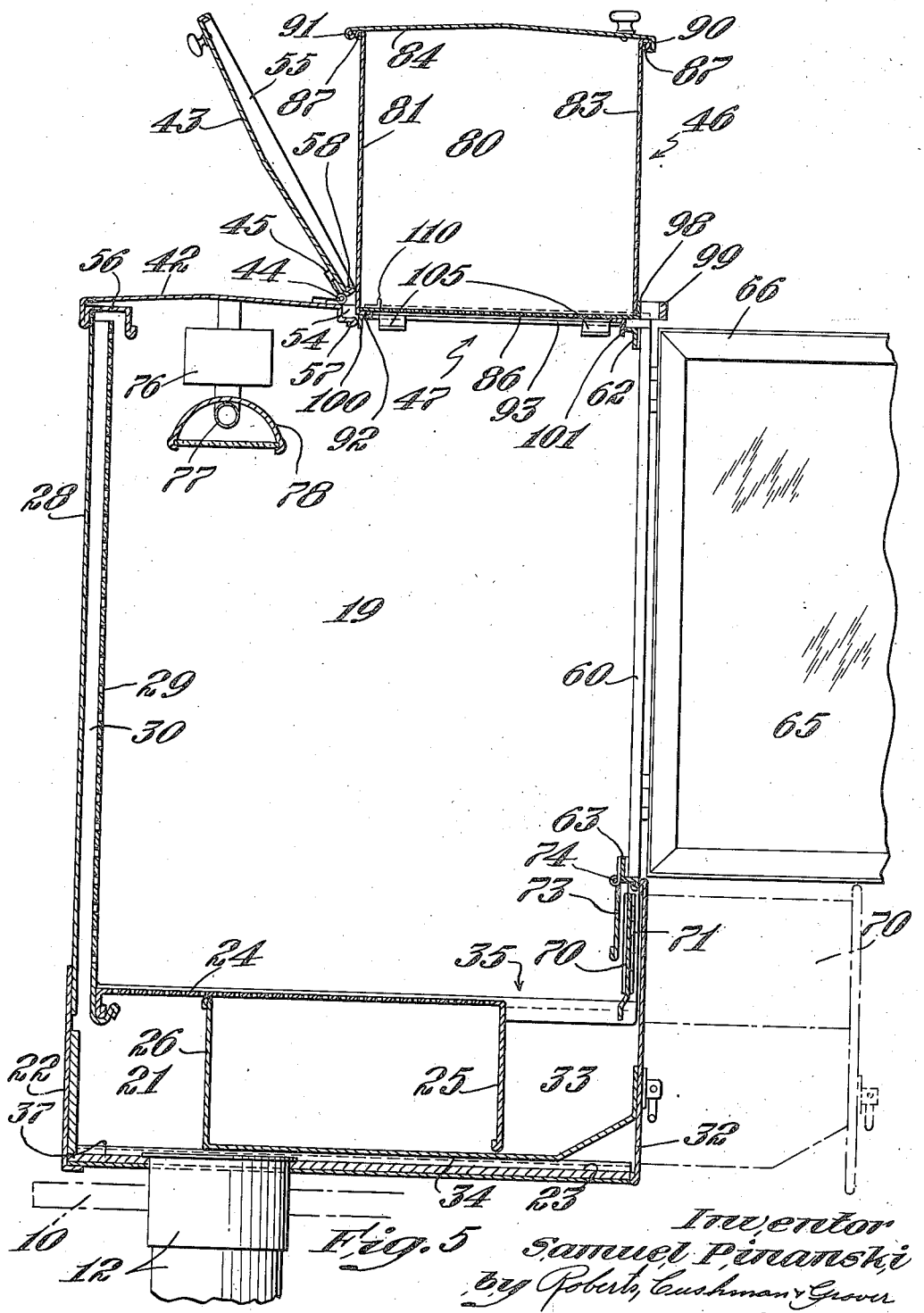
Fig. 5 is an enlarged section on the line 5—5 of Fig. 2, with the front door shown in open position and the dispensing drawer shown in closed position.

The top of the main storage chamber 19 consists of the imperforate end top members 40 and 41 (Figs. 3 and 4), the imperforate rear top member 42 and the imperforate cover top member 43 which is secured to the rear top member by a pair of hinges 44 (Fig. 5). The lower arms of the cover supporting members 45 are rigidly secured to the rear top member 42 and the upper arms thereof function to support the cover 43 when it is elevated, as illustrated. When the auxiliary storage chamber 46 is removed, a filling aperture 47 is provided in the top of the main storage chamber 19 which is substantially the size of the cover top member 43 and which may be closed by lowering the cover 43 about the hinges 44 thereby to again provide a substantially air and dust-tight main storage chamber 19.

The end top members 40 and 41 are provided with spaced flanges 48—49 and 50—51 which receive the upper ends of the glass panels 27 and 26ᵃ, respectively. Each of these end top members is provided with an upwardly extending flange 54 (Fig. 4) which support the ends of the auxiliary storage chamber 46 when it is in place transversely of the fitting aperture 47 and which abut the end edge flanges 55 (Fig. 5) of the cover 43 when the auxiliary chamber 46 is removed and the cover 43 is closed.

The flange 56 on the rear edge of the top member 42 extends across the flue 30 and serves to deflect downwardly hot air rising through the flue. The flange 57 on the front edge of the top member 42 (Fig. 5) serves to form a substantially airtight seal between the back of the auxiliary storage chamber 46 when the latter is in place and between the back flange 58 of the cover 43 when the cover is closed.

The vertical channel members 60 and 61 (Figs. 2 and 5) are secured to the members 22, 48 and 50 and they receive the forwards ends of the glass panels 26ᵃ and 27, respectively. The angle member 62 (Fig. 5) extends between the channel members 60 and 61 at the top thereof and the angle member 63 extends between them at the bottom thereof. The members 60, 61, 62 and 63 form the sides of an opening which is normally closed by a front door comprising the glass panel 65, frame 66, hinges 67 and catch 68. The upper edge of the door forms a support for the cover 43 when the latter is closed.

The forward edges of the plenum chamber side wall 22 are spaced apart for the reception between them of the dispensing drawer formed by the drawer front wall 32, parallel side walls 33, bottom wall 34 and back wall 26. The bottom wall 34 of the drawer is slideable upon parallel runway members 37 secured to the bottom 23 of the plenum chamber adjacent to the side walls 33, and its back wall 26 is engageable with the flange 25 to limit outward sliding movement of the drawer. The opening 35 in the storage chamber floor 24 permits material to flow by gravity at all times from the main storage chamber to the dispensing drawer. The drawer is maintained in the open position shown in dot dash in Fig. 5 throughout dispensing use of the apparatus.

To the members 60 and 61, below the front door, there are secured a pair of hinged wings 70 (Fig. 5) which, when the drawer is pulled outwardly may be swung into a position so as to form upward extensions of the side walls 33 as shown in full in Fig. 1 and dot dash in Fig. 5, thus providing an open topped dispensing receptacle having an effective depth of substantially the height of the front wall 32. One wing 70 and its hinge 71 are shown in closed position in Fig. 5. In order to partially guard the opening below the front door when the wings are in open position, a flap 73 is pivotally supported to the angle member 63 at 74 and it extends throughout the width of and, partially closes the space between the channels 60 and 61 below the lower edge of the front door.

In the upper rear portion of the main storage chamber 19 a support 76 is provided for a lamp 77 having a reflector 78, the lamp being supplied with current by means of a suitable conductor, not shown. The lamp 77 may, if desired, be colored so as to impart a pleasing color to the contents of the cabinet, and, if desired, color changing arrangements may be used thereby to provide an attractive and interest-arousing effect.

The auxiliary storage chamber 46 is removably supported transversely of the filling aperture 47 when the cover 43 is in open position as shown in the drawings. The auxiliary storage chamber is constructed of an imperforate side wall, consisting of the side wall members 80, 81, 82 and 83, the imperforate cover member 84 and a perforate bottom wall consisting of the two slideable portions 85 and 86. The side wall members 80, 81, 82 and 83 are secured together at the corners of the chamber by welding, soldering or otherwise, and their top edges are rolled over above a piece of steel wire 87. Each of the hinges 88 is riveted or otherwise secured to the cover 84 and is pivotally secured about the wire 87 by means of an integral tubular member 89 through which the wire passes loosely. The front and side edges of the cover 84 are provided with a flange 90 which overlaps the beaded edge of the side wall members, and the rear edge of the cover is provided with a rolled edge 91 which provides a substantially air-tight joint with the corresponding rolled edge of the back side member 81.

A horizontal flange 92 is bent inwardly from the lower edge of the back side member 81 and this flange underlies the inner end of the slideable bottom wall portions 85 and 86 when they are in closed position (see Fig. 5). Inwardly extending flanges 93 are provided integral with the side wall end members 80 and 82 and these flanges form the abutment shoulders 94 upon which the auxiliary storage chamber is supported and their lower inwardly extending extremities also form part of the runways for the slideable bottom wall members 85 and 86. A pair of inwardly and downwardly extending flanges 95 are secured in parallel spaced relationship relative to the flanges 93 and they cooperate with the flanges 93 to form the outer runways for the bottom wall portions 85 and 86. A transversely extending member 96, I-shaped in cross section, extends transversely of the bottom opening of the auxiliary chamber and is secured to the flange 92 and the angle member 101 which is provided between the flanges 93. This member 96 provides the runways for the adjacent inner edges of the slideable bottom wall members 85 and 86 as shown in Fig. 4. An upturned flange 98 is provided on the outer end of each slideable portion 85 and 86 and handles 99 are secured to these upturned flanges. The flanges 98 limit inward sliding movement of the bottom wall portions 85 and 86.

Thus the members 93, 95 and 96 form a pair of parallel runways which support the bottom wall members 85 and 86 for movement outwardly and inwardly of the auxiliary storage chamber and the handles 99 may be grasped to effect such movement.

An angle member 100 is secured to the inturned flange 92 of the back side wall member 81. The angle member 100 forms a substantially air-tight seal with the front edge of the inturned flange 57 of the rear top member 42 and the angle member 101 forms a substantially air-tight seal with the transversely extending member 62 (Fig. 5). Accordingly, a substantially air-tight seal is provided between the auxiliary storage chamber 46 and the edges of the filling opening 47 of the main storage chamber.

Four legs 105 have their upper portions secured between the flanges 93 and 95 and serve to support the auxiliary storage chamber 46 when it is removed.

A pair of stop members 110 are secured to the slideable bottom walls 85 and 86 and upon outward sliding movement of the bottom walls the upstanding portions of the stop members engage the side wall 83 to limit such outward sliding movement.

In operation, the main storage chamber 19 of the dispensing apparatus is substantially filled with popped corn, potato chips, or the like, either through the filling opening 47 or through the front door 65 and the auxiliary storage chamber 46 is also filled with the same material.

The dispensing drawer may either be closed during the initial warmup period or it may be opened as shown in Fig. 1 and a cover of metal or the like may be placed upon the opening provided by the top edges of the wings 70 and the top edge of the drawer front wall 32.

The thermostat 14 is then set for the desired temperature which depends upon the material to be dispensed. For use in dispensing popped corn, the thermostat may be set for 120° F. The blower and the heating element are then set in operation by throwing an appropriate switch or switches (not shown) and warm air is then delivered through the sleeve 12 into the plenum chamber 21 by the blower. This air is under slightly superatmospheric pressure and it passes upwardly through the perforations in the bottom wall 24, upwardly through the flue 30, inwardly through the perforations in the member 29 and also downwardly between the deflector 56 and the upper end of the member 29. The warm air also passes upwardly from the main storage chamber through the perforations in the slideable wall members 85 and 86 and thence to the auxiliary storage chamber 46.

As soon as the material in the main storage chamber has been heated to the desired temperature, in the case of popped corn for example, from about 105° to about 120° F., the dispensing drawer is opened, or the cover is removed from the top opening thereof, and the apparatus is then ready for continuous use in dispensing the material to customers. During such use, the drawer is maintained in its outwardly extending position and the warm air at slightly superatmospheric pressure passes downwardly from the main storage chamber through the dispensing aperture 35 and outwardly and upwardly through the popped corn or other material which is confined within the side and front walls of the outwardly extending portion of the dispensing drawer and thence to the atmosphere through the open top of the drawer. This diffuses to customers an odor of the material being dispensed and it also maintains the material warm and crisp so that it may be served directly from the open portion of the drawer.

The quantity of air which is introduced to the main storage chamber is sufficient so that a supply of warm air is maintained in the auxiliary storage chamber 46. As soon as the attendant notices that the quantity of material in the main storage chamber is becoming depleted he slides the bottom wall portions 85 and 86 outwardly and this causes the material in the auxiliary storage chamber to fall downwardly through the filling aperture 47 to the main storage chamber. The bottom wall portions 85 and 86 are then slid inwardly of the auxiliary storage chamber and the auxiliary storage chamber is refilled with popped corn or other material as soon as the attendant has free time between sales. The refilling may be accomplished by merely lifting the cover 84 of the auxiliary storage chamber and without removing the auxiliary storage chamber 46 from the filling aperture 57.

While the auxiliary storage chamber has been illustrated as rectangular in horizontal section, it may be circular in horizontal section or any other desired shape. Instead of being removable, it may be made integral with the main storage chamber, in which event the cover 43 may be eliminated. The bottom wall of the auxiliary storage chamber may be made in one piece by eliminating the member 96 and utilizing the end runways for the ends of the single slideable bottom member which is substituted for the members 85 and 86. It is unnecessary to have the entire bottom wall slideable and accordingly one or more slideable portions may be provided in a bottom wall of the auxiliary storage chamber.

It will be apparent to persons skilled in the art that I have provided a preserving and dispensing apparatus which may be operated by a single attendant to provide a continuous supply of warm and crisp comestibles, that the apparatus is economical to manufacture and simple to operate, that it may be easily and cheaply installed in or combined with apparatus which are now or hereafter available on the market and that the apparatus may be tightly closed to prevent the entry of dust or dirt when not in use and to insure the circulation of warm air to the auxiliary storage chamber and through the material in the open dispensing drawer or receptacle when in use.

While one desirable embodiment of the invention has been illustrated by way of example, it is to be understood that the invention is not necessarily limited to this embodiment but is inclusive of any and all modifications falling within the scope of the appended claims.

I claim:

1. In apparatus for dispensing popped corn, potato chips or the like having a main storage chamber for the material to be dispensed, a filling aperture at the top thereof and means operative to deliver heated air to the main storage chamber, the improvement comprising an auxiliary storage chamber having side and top walls and a bottom wall located transversely of said filling aperture, said bottom wall having a portion at least which is slideable inwardly and outwardly of the auxiliary storage chamber, whereby upon outward sliding movement thereof material falls downwardly by gravity from the auxiliary storage chamber through said filling aperture into the main storage chamber.

2. In apparatus for dispensing popped corn, potato chips or the like having a main storage chamber for the material to be dispensed, a filling aperture at the top thereof and means operative to deliver heated air to the main storage chamber, the improvement comprising an auxiliary storage chamber having substantially imperforate side and top walls and a perforate bottom wall located transversely of said filling aperture, said bottom wall having a portion at least which is slideable inwardly and outwardly of the auxiliary storage chamber, whereby upon outward sliding movement thereof material falls downwardly by gravity from the auxiliary storage chamber through said filling aperture into the main storage chamber.

3. In apparatus for dispensing popped corn, potato chips or the like having a main storage chamber for the material to be dispensed, a filling aperture at the top thereof and means operative to deliver heated air to the main storage chamber, the improvement comprising an auxiliary storage chamber having side and top walls, a bottom wall located transversely of said filling aperture and a runway parallel to said bottom wall, said bottom wall having a portion at least which is slideable in said runway inwardly and outwardly of the auxiliary storage chamber, whereby upon outward sliding movement of said bottom wall portion material falls downwardly by gravity from the auxiliary storage chamber through said filling aperture into the main storage chamber.

4. In apparatus for dispensing popped corn, potato chips or the like having a main storage chamber for the material to be dispensed, a filling aperture at the top thereof and means operative to deliver heated air to the main storage chamber, the improvement comprising an auxiliary storage chamber having substantially imperforate side and top walls, a perforate bottom wall located transversely of said filling aperture and a runway parallel to said bottom wall, said bottom wall having a portion at least which is slideable inwardly and outwardly of the auxiliary storage chamber, whereby upon outward sliding movement of said bottom wall portion material falls downwardly by gravity from the auxiliary storage chamber through said filling aperture into the main storage chamber.

5. In apparatus for dispensing popped corn, potato chips or the like having a main storage chamber for the material to be dispensed, a filling aperture at the top thereof and means operative to deliver heated air to the main storage chamber, the improvement comprising an auxiliary storage chamber having side and top walls, a bottom wall located transversely of said filling aperture and said bottom wall having a portion at least which is slideable inwardly and outwardly of the auxiliary storage chamber and stop means projecting from said bottom wall, said stop means being engageable with said side wall to limit outward sliding movement of said bottom wall portion, whereby upon outward sliding movement of said bottom wall portion material falls downwardly by gravity from the auxiliary storage chamber through said filling aperture into the main storage chamber.

6. In apparatus for dispensing popped corn, potato chips or the like having a main storage chamber for the material to be dispensed, a filling aperture at the top thereof and means operative to deliver heated air to the main storage chamber, the improvement comprising an auxiliary storage chamber having side and top walls, a bottom wall located transversely of said filling aperture, said bottom wall having a portion at least which is slideable inwardly and outwardly of the auxiliary storage chamber, first stop means projecting from said bottom wall adjacent to the inner end thereof and second stop means projecting from said bottom wall adjacent to the outer end thereof, said first stop means being engageable with said side wall to limit outward sliding movement of said bottom wall portion and said second stop means being engageable with said side wall to limit inward sliding movement of said bottom wall portion.

7. In apparatus for dispensing popped corn, potato chips or the like having a main storage chamber for the material to be dispensed, a filling aperture at the top thereof and means operative to deliver heated air to the main storage chamber, the improvement comprising an auxiliary storage chamber having side and top walls, a bottom wall located transversely of said filling aperture, said bottom wall having a portion at least which is slideable inwardly and outwardly of the auxiliary storage chamber, a flange on the outer edge of said slideable bottom portion, said flange being located exteriorly of the auxiliary storage chamber, and a handle on said flange, whereby upon outward movement of said handle said bottom portion slides outwardly and material falls downwardly by gravity from the auxiliary storage chamber through said filling aperture into the main storage chamber.

8. In apparatus for dispensing popped corn, potato chips or the like having a main storage chamber for the material to be dispensed, a filling aperture at the top thereof and means operative to deliver heated air to the main storage chamber, the improvement comprising an auxiliary storage chamber having side and top walls, hinge means secured to the side and top walls whereby the top wall may be rotated to provide an opening at the top of the auxiliary storage chamber, and a bottom wall located transversely of said filling aperture, said bottom wall having a portion at least which is slideable inwardly and outwardly of the auxiliary storage chamber, whereby upon outward sliding movement thereof material falls downwardly by gravity from the auxiliary storage chamber through said filling aperture into the main storage chamber.

9. In apparatus for dispensing popped corn, potato chips or the like having a main storage chamber for the material to be dispensed, a filling aperture at the top thereof and means operative to deliver heated air to the main storage chamber, the improvement comprising an auxiliary storage chamber having substantially imperforate side and top walls, hinge means secured to the side and top walls whereby the top wall may be rotated to provide an opening at the top of the auxiliary storage chamber, and a perforate bottom wall located transversely of said filling aperture, said bottom wall having a portion at least which is slideable inwardly and outwardly of the auxiliary storage chamber, whereby upon outward sliding movement thereof material falls downwardly by gravity from the auxiliary storage chamber through said filling aperture into the main storage chamber.

SAMUEL PINANSKI.

REFERENCES CITED

The following references are of record in the file of this patent:

UNITED STATES PATENTS

| Number | Name | Date |
|---|---|---|
| 1,488,965 | Wicker | Apr. 1, 1924 |
| 1,766,846 | Thomas | June 24, 1930 |
| 1,780,649 | Jacobs | Nov. 4, 1930 |
| 2,109,597 | Richeson | Mar. 1, 1938 |

Certificate of Correction

Patent No. 2,441,250.

May 11, 1948.

SAMUEL PINANSKI

It is hereby certified that error appears in the printed specification of the above numbered patent requiring correction as follows: Column 3, line 49, for the word "fitting" read *filling*; and that the said Letters Patent should be read with this correction therein that the same may conform to the record of the case in the Patent Office.

Signed and sealed this 6th day of July, A. D. 1948.

[SEAL]

THOMAS F. MURPHY,
*Assistant Commissioner of Patents.*